UNITED STATES PATENT OFFICE

FRANZ MIK, OF KREUZLINGEN, SWITZERLAND, ASSIGNOR TO HOLZVERKOHLUNGS-INDUSTRIE AKTIENGESELLSCHAFT, OF CONSTANCE, GERMANY, A CORPORATION OF GERMANY

ACTIVATED CHARCOAL

No Drawing. Application filed February 6, 1929, Serial No. 338,020, and in Germany December 27, 1927.

My invention relates to a method of producing activated charcoal of high quality and at a low cost.

Hard woods, for instance, beech wood, are not suitable raw material for the production of high-grade activated charcoal. Charcoal which has been produced from such wood in the usual manner cannot be satisfactorily treated to yield a high-grade activated charcoal by any of the well-known activating processes which, when applied to pine and other soft wood charcoals (for example, linden or alder wood) produce a good yield of highly activated charcoal. Such known activating treatment may comprise for example subjection of the charcoal to an activating gas, such as steam and carbon dioxide, at a temperature of 600° to 800° C. Even when hard wods are activated chemically, i. e. are impregnated, before carbonization, with chemical substances, such as potash, sulfates or bisulfates of the alkalies, phosphoric acid or phosphates, etc., followed by carbonization, they yield rather unsatisfactory results and above all a charcoal that is so non-uniform in character that the average activity of the finished product is poor.

I have found that hard woods which have proved unsatisfactory for the production of activated charcoal offer an excellent raw material for the production of highly activated charcoal when carbonized in the condition of so-called white rot. Charcoal produced from hard wood white rot is very easily and rapidly converted into a highly active product when treated according to known charcoal activating processes, such as treatment with an activating gas or with chemicals; while at the same time a good yield also in respect to quality is obtained. Such diseased wood represents an even more advantageous raw material under certain conditions than pine or other soft woods, its value for this purpose increasing as white rot decomposition increases.

The rotted wood may be converted into a highly active charcoal in accordance with any of the known methods of treating any known wood for such purpose, such as the gas and chemical treatments indicated above, which methods are subsumed under the expression "carbonizing and activating".

I claim:

A highly activated charcoal produced from hard wood in the condition of white rot.

FRANZ MIK.